(12) United States Patent
Langenfeld et al.

(10) Patent No.: US 7,111,457 B1
(45) Date of Patent: Sep. 26, 2006

(54) DIAGNOSTIC SYSTEM FOR A HYDROSTATIC TRANSMISSION OR TRANSAXLE

(75) Inventors: Thomas J. Langenfeld, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 77 days.

(21) Appl. No.: 10/865,981

(22) Filed: Jun. 12, 2004

(51) Int. Cl.
*F16D 31/02* (2006.01)

(52) U.S. Cl. .......................................... 60/328; 60/387

(58) Field of Classification Search ................ 60/328, 60/468, 487
See application file for complete search history.

(56) References Cited

U.S. PATENT DOCUMENTS

| | | | |
|---|---|---|---|
| 3,591,965 A | * | 7/1971 | Bobst et al. .................. 60/487 |
| 5,314,387 A | | 5/1994 | Hauser et al. |
| 6,185,936 B1 | | 2/2001 | Hauser et al. |
| 6,237,331 B1 | * | 5/2001 | Sorensen .................... 60/384 |
| 6,272,854 B1 | * | 8/2001 | Ishii et al. .................... 60/487 |

* cited by examiner

Primary Examiner—F. Daniel Lopez
(74) Attorney, Agent, or Firm—Neal, Gerber & Eisenberg LLP

(57) ABSTRACT

An improved diagnostic system for a hydrostatic apparatus such as a hydrostatic transmission or transaxle is disclosed. A fastener having a port formed therein is used to connect a hydraulic component such as a center section to a housing. A diagnostic system may be located external to the housing and connected to the hydraulic circuit at least partially through the fastener port. A relief valve may also be located in the fastener and connected to the fastener port, or in a different fastener having a separate fastener port, to permit the fluid in the hydraulic circuit to be discharged to a sump.

30 Claims, 9 Drawing Sheets

DIAGNOSTIC SYSTEM FOR A HYDROSTATIC TRANSMISSION OR TRANSAXLE

BACKGROUND OF THE INVENTION

This invention relates to hydrostatic transmissions and transaxles generally and, in particular, to diagnostic systems for use in such units.

SUMMARY OF THE INVENTION

This invention discloses an improved diagnostic system for use with a hydrostatic transmission or transaxle or a similar hydrostatic or hydraulic apparatus. This invention permits easier access to the hydraulic system for performing diagnostic tests on the unit without the need to open the unit. It is well-known that one will frequently need to test a unit such as a hydrostatic transmission or transaxle. This testing arises with field units when performance has decreased or if there is a question about the performance level of a unit. In known designs, a diagnostic unit may be created by penetrating the housing wall with hydraulic lines that are attached to the hydraulic porting of a center section located within the housing, or by penetrating the housing wall with porting formed in the center section. Penetrating the housing wall with porting formed in the center section also adds expense and complexity that is likely not required for most units.

In the present invention, a passage may be created in the housing wall and a fitting inserted therein to access porting within the center section. Such a passage may be machined after a unit is assembled, offering the opportunity to access center section porting only when needed. The ability to form the passage after assembly of the unit also means that the passage may be created in the field when needed versus having the expense of every unit being so configured.

The invention herein comprises an improved diagnostic apparatus which, in one embodiment, can be formed as part of the fastener holding a hydrostatic transmission center section to the housing. Other embodiments are possible within the scope of this invention. This diagnostic system can be connected to a test system external to the vehicle, such as in a laboratory, or it can be connected to an onboard system to provide the status information to the vehicle user.

This invention also discloses an improved relief valve that may also be used in conjunction with the other features of the invention or may be used on its own. The relief valve is formed as part of a fastener used to secure a center section to a housing element.

This invention is specifically described in connection with a zero turn apparatus vehicle similar to that shown in U.S. Application No. 60/572,163 commonly owned with this application and filed on May 18, 2004. The terms of that application are incorporated herein by reference. It will be understood, however, that this invention is not specific to any one transaxle or transmission design and that it can also be used with other transaxles or transmissions. Some of these are shown, e.g., in U.S. Pat. No. 5,314,387 and U.S. Pat. No. 6,185,936, which are commonly owned with this application and which are also incorporated herein by reference.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE INVENTION

Figure 1:
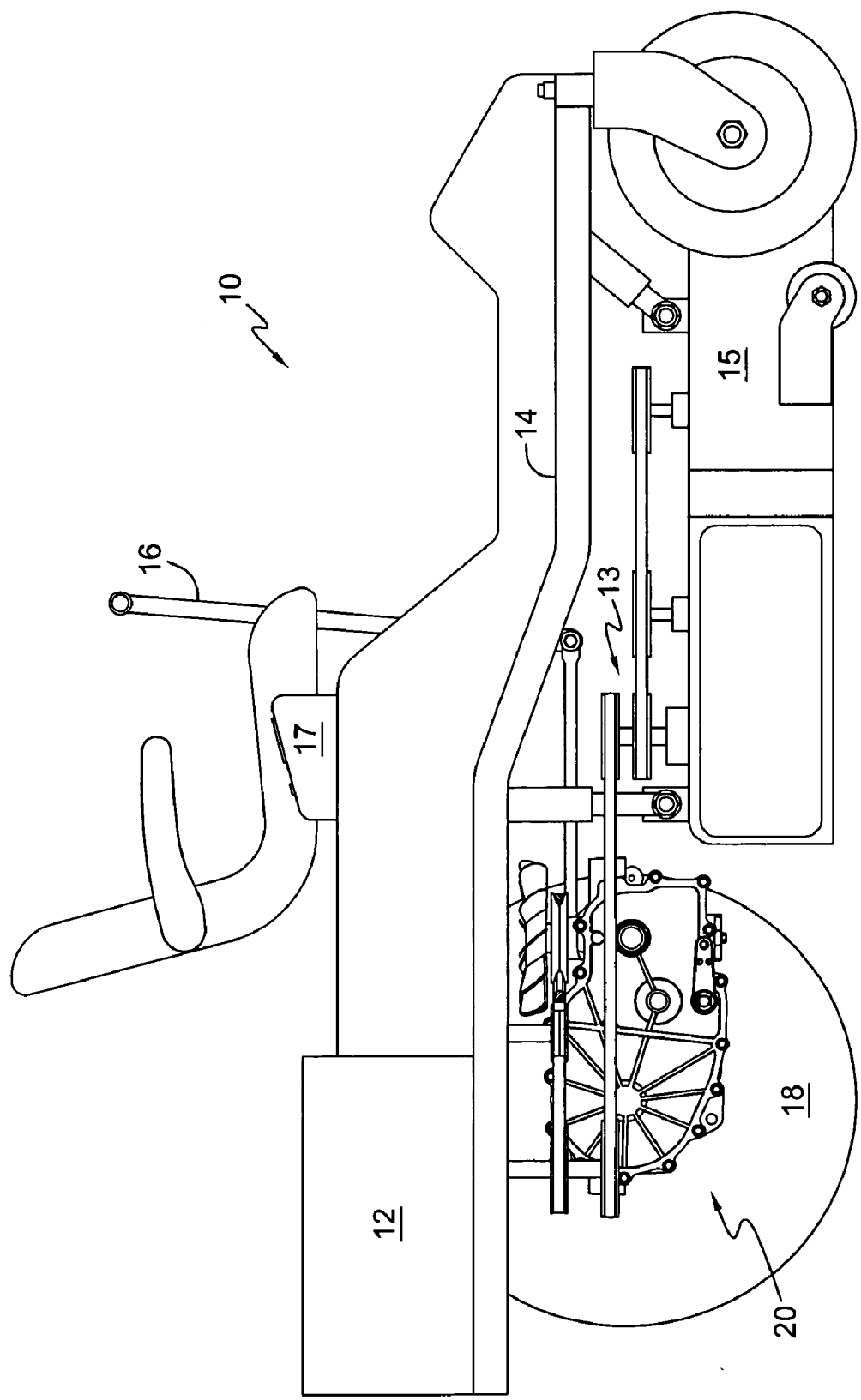
FIG. 1 is a side elevational view of an exemplary vehicle in accordance with the subject invention with one rear wheel and one drive apparatus removed for clarity.

This invention is described herein with respect to exemplary vehicle 10, which is shown in FIG. 1 with one rear wheel and one driving unit removed for clarity. It will be understood that other transmissions, transaxles, vehicles and applications can be used in accordance with the present invention.

Hydrostatic transaxles are well-known in the art, and the internal functioning of the various components, such as the pump, motor, hydraulic porting and the like are described in U.S. Pat. Nos. 5,314,387 and 6,185,936. In the figures herein, center section 40 is attached to housing 21 by means of horizontal fasteners 49 which are parallel to the axle 24. In other designs, such as that shown in U.S. Pat. No. 5,314,387, the center section fasteners are shown as being vertical, i.e., perpendicular to the axles. The direction of the fasteners with respect to the axles or the split line of the housing elements is not critical to this invention.

In this embodiment, vehicle 10 includes a prime mover or engine 12 and a pair of transaxles 20 mounted on frame 14 and having a pair of driven wheels 18 driven by axles 24. Such vehicles generally include a driven apparatus such as mower deck 15, which is connected to transaxle 20 through a belt and pulley assembly 13. There generally will be two user controls 16 which are connected to the respective transaxles 20 to control the output speed and direction thereof. A console 17 may be located to be accessible to the driver. It will be understood that there will be additional linkages and the like, such as engine controls and brake linkages, which are not important to this invention. Only one transaxle 20 is shown in FIG. 1 for clarity, and each transaxle has an output axle 24. Other designs can include a pair of output axles linked through a differential in a single transaxle housing.

Figure 2:
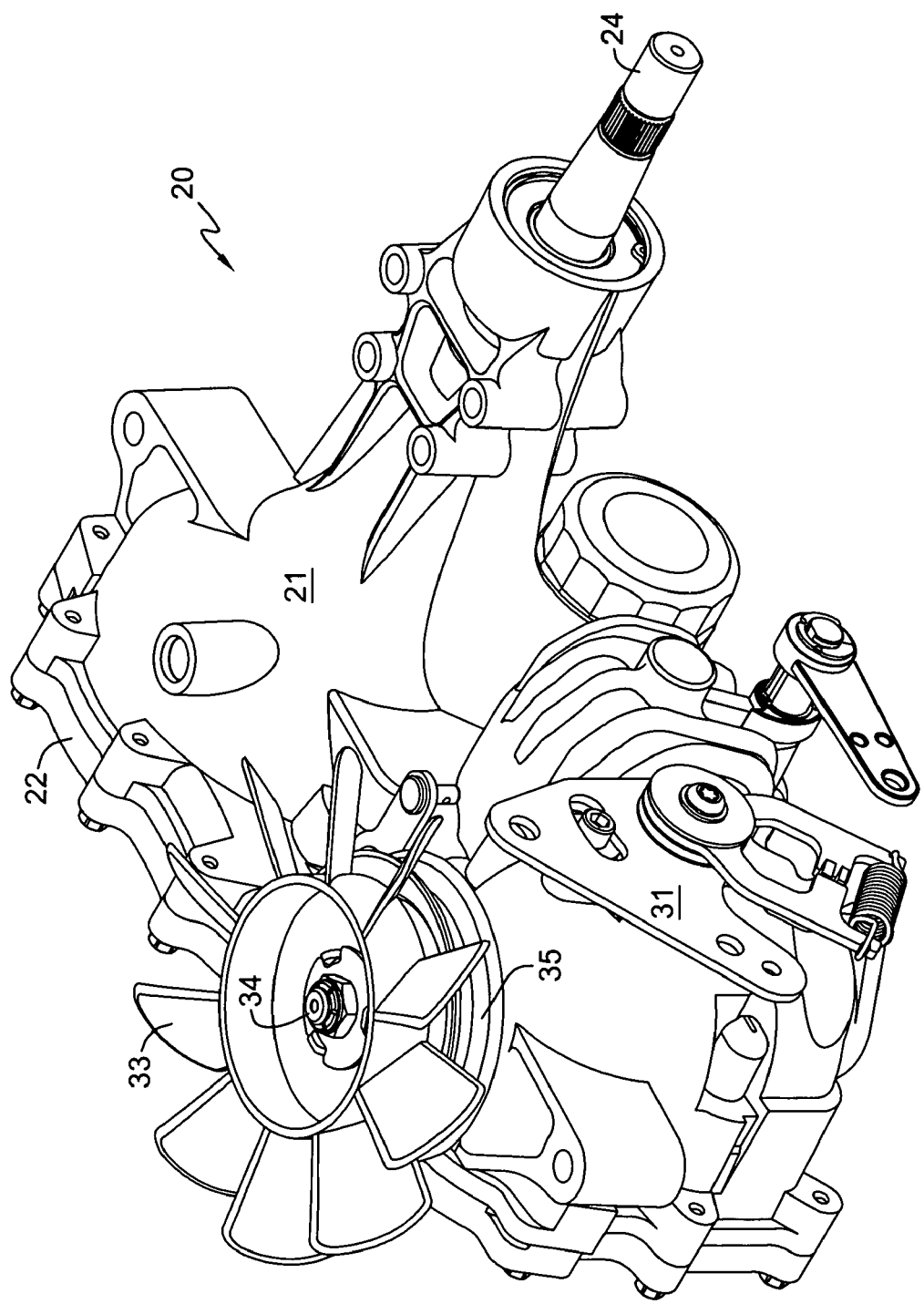
FIG. 2 is a perspective view of an exemplary hydrostatic transmission in accordance with the subject invention.
Figure 3:
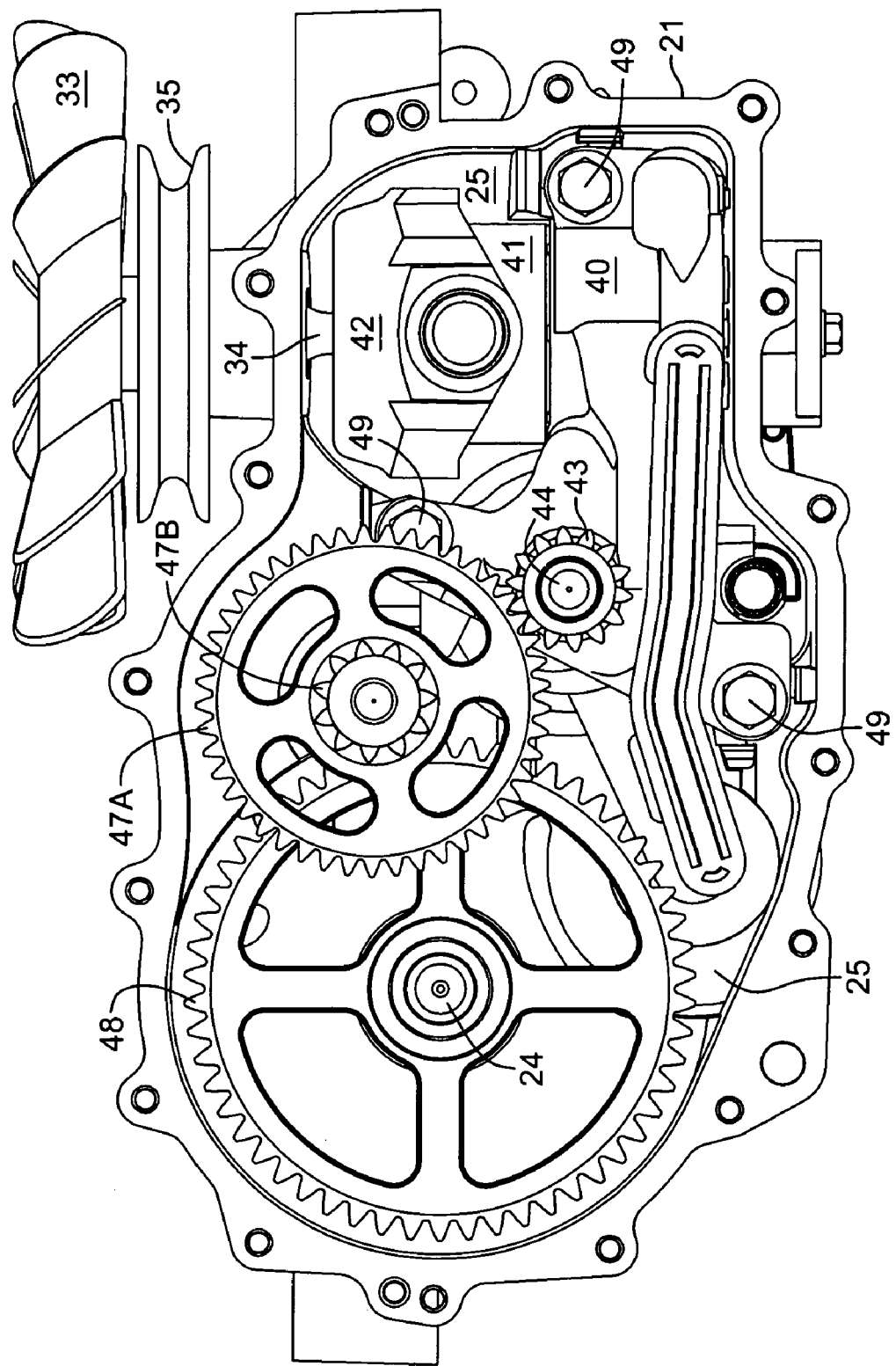
FIG. 3 is a side elevational view of the transaxle shown in FIG. 2 with one housing cover removed to show the internal structure of the unit.
Figure 7:
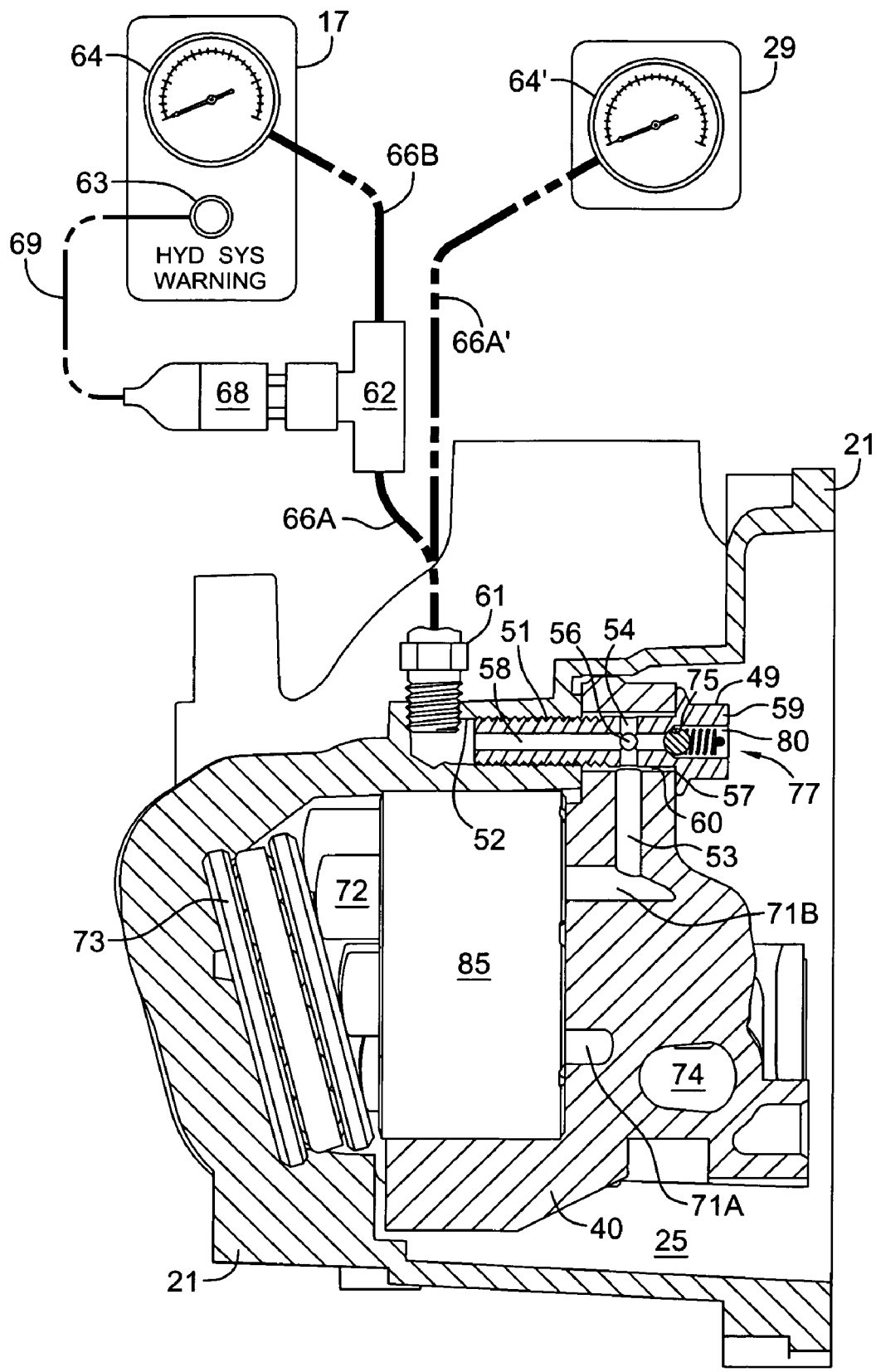
FIG. 7 is a cross-sectional view along the lines 7—7 in FIG. 4, with certain components not hatched for clarity.

Transaxle 20 is shown in detail in FIGS. 2, 3 and 7. A main housing 21 is joined to side housing 22 along a split line perpendicular to output axle 24 to form an oil sump 25. FIG. 3 shows an internal view of transaxle 20. Center section 40 is mounted in sump 25 and is preferably secured to main housing 21 through a plurality of fasteners 49. As is known in the art, input shaft 34, which is driven by pulley 35, drives rotatable pump cylinder block 41, which includes a plurality of axial pistons (not shown). A fan 33 may be mounted on input shaft 34. Since axial piston pumps and motors are well known in the art, the pistons for pump cylinder block 41 are not shown in detail in these figures. As is known in the art, motor thrust bearing 73 can be supported entirely within housing 21 at a fixed angle, and motor pistons 72 abut fixed bearing 73.

The pump pistons (not shown) abut moveable swash plate 42, which is connected to control arm 31 through a trunnion shaft (not shown) to control the direction and output of the unit. Pump cylinder block 41 is connected to motor cylinder block 85 through hydraulic porting 70 located inside center section 40. Motor output shaft 44 is driven by motor cylinder block 85 and has a gear 43 engaged thereto. A gear train comprising gear 43, intermediate gears 47A and 47B and output gear 48 transfer rotational force from motor output shaft 44 to output axle shaft 24.

Figure 4:
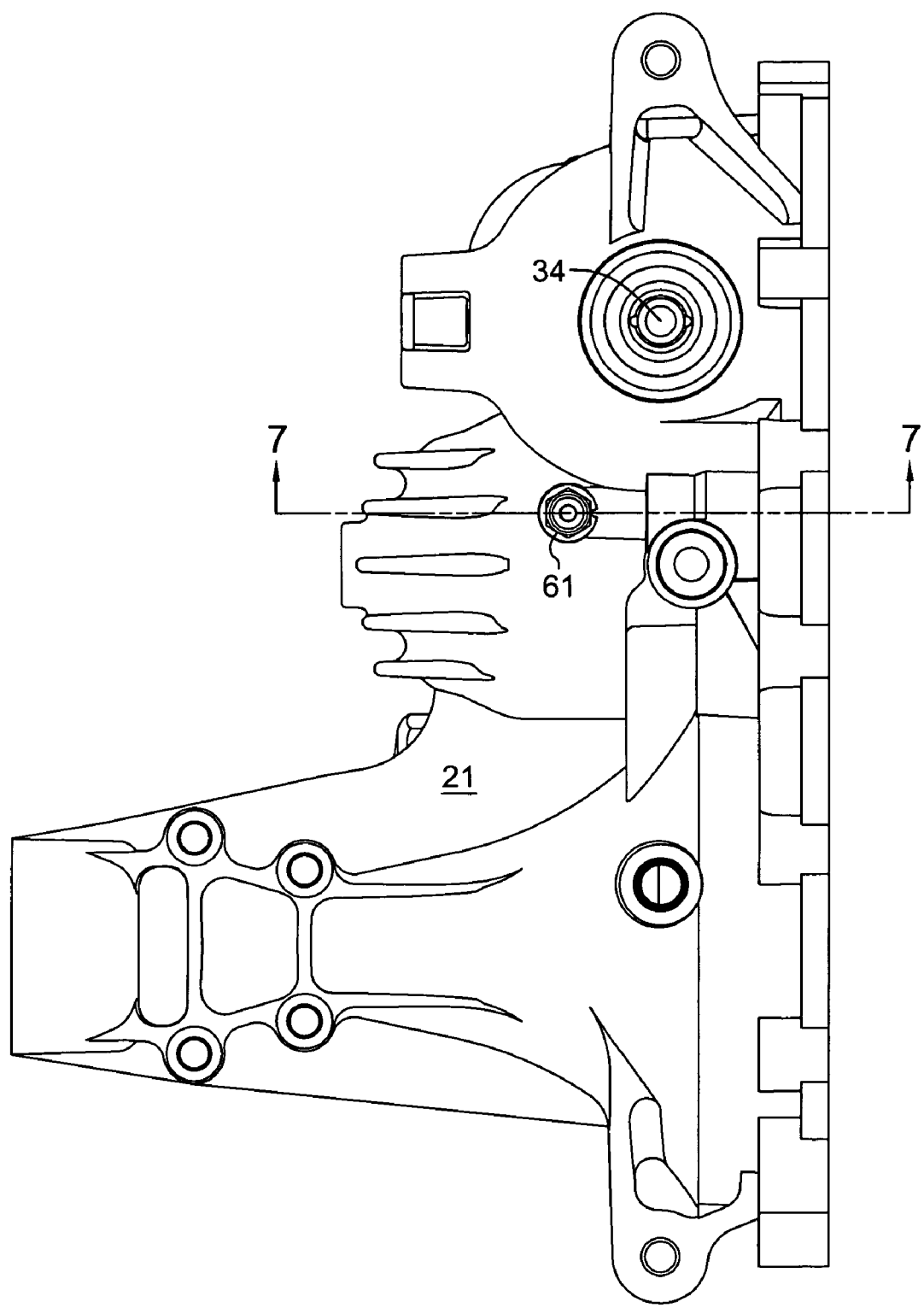
FIG. 4 is a top plan view of a portion of the housing of the hydrostatic transaxle shown in FIG. 2.
Figure 5:
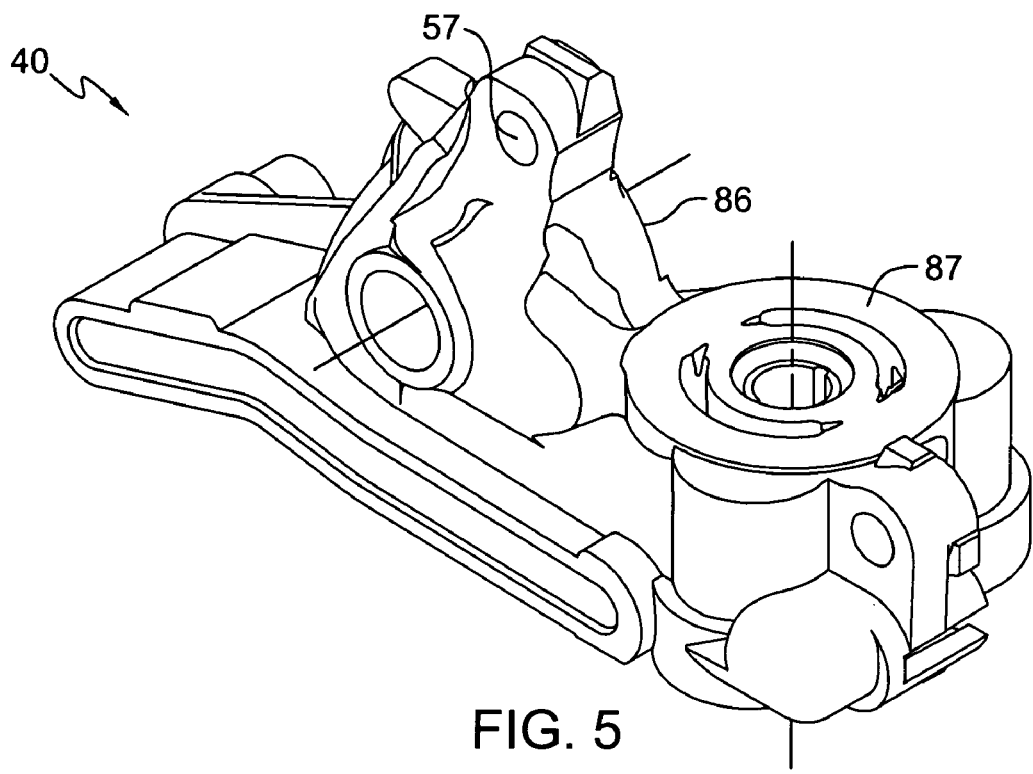
FIG. 5 is a perspective view of the exemplary center section of the hydrostatic transaxle shown in FIG. 2.
Figure 6:
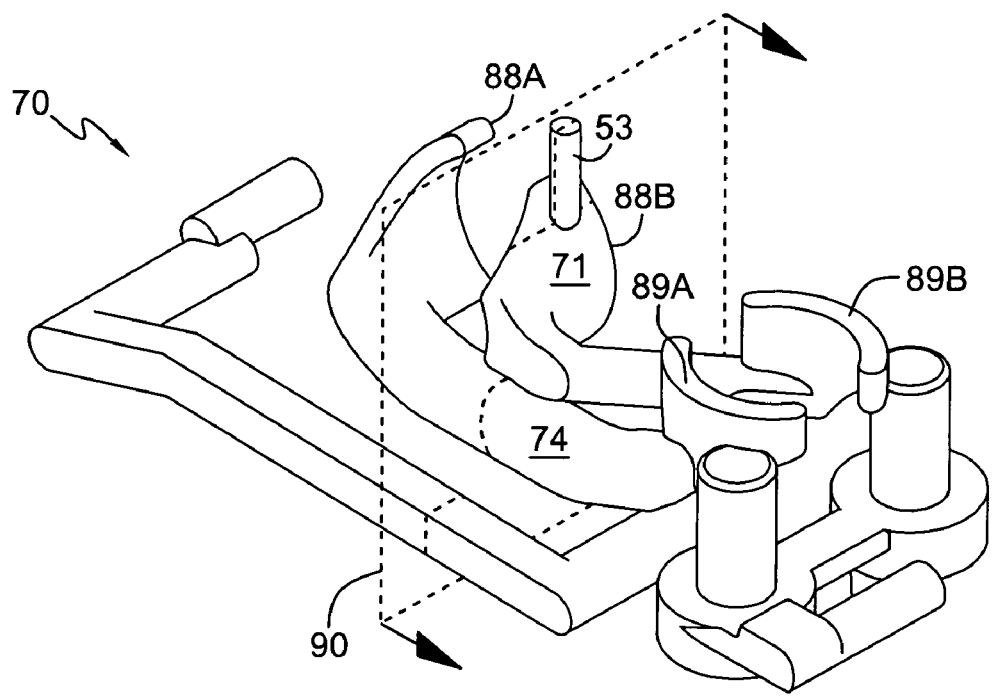
FIG. 6 is a stylized perspective view of the hydraulic porting of the center section shown in FIG. 5.

Center section 40 is shown most clearly in FIGS. 5 and 6. The stylized drawing of FIG. 6 depicts the hydraulic porting 70 formed in center section 40; this figure also shows plane 90 where the cross-sectional cut line 7—7 of FIG. 4 will be on center section 40 to assist in the understanding of the portions of hydraulic porting 70 shown in FIG. 7 and the other related figures. Center section 40 comprises a pump running surface 87 having a pair of pump kidneys 89A and 89B formed thereon and a motor running surface 86 having a pair of motor kidneys 88A and 88B formed thereon.

FIG. 7 shows a portion of center section 40 mounted in sump 25 and secured to housing 21 by at least one fastener 49. As noted previously, certain features shown in FIG. 7, such as cylinder block 85, bearing 73 and others are shown solid to assist with clarity. Due to the cross-sectional cut of FIG. 7, the pair of passages 71A and 71B is actually two portions of port 71, which is connected to motor kidney 88B. Another passage 74 is connected to the other motor kidney 88A. An additional passage 53 is bored into center section 40 and is connected to one of the passages 71A or 71B.

Figure 9:
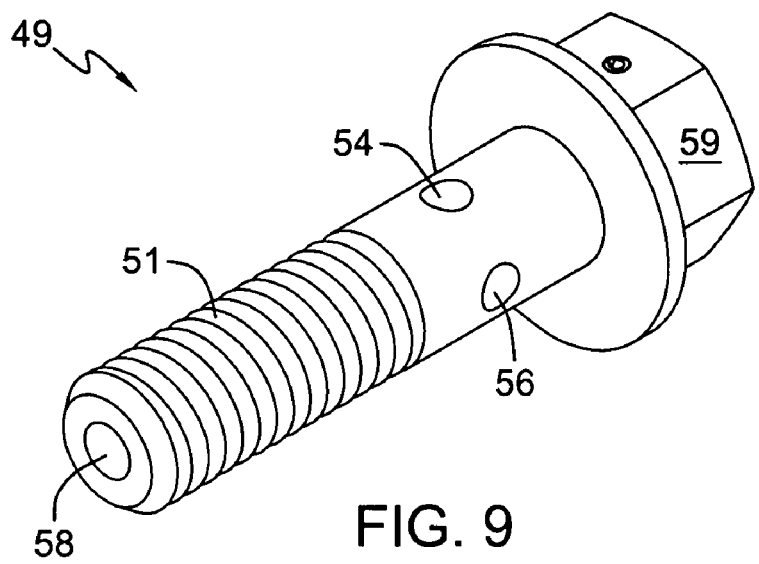
FIG. 9 is a perspective view of an exemplary fastener for use in accordance with one embodiment of this invention.

Fastener 49 passes through opening 57 formed in center section 40. It is threaded into opening 52 formed in housing member 21 by means of threads 51, thereby securing center section 40 to housing member 21. Fastener 49 is preferably a hex-head bolt as shown most clearly in FIGS. 9 and 10 and has a threaded portion 51 and head portion 59.

Fastener 49 is shown with a pair of cross passages 54 and 56, which may be drilled therein. When used with diagnostic elements 29, 63 or 64 that requires minimal flow, only one passage 54 or 56 may be necessary. Such passage may be formed from the exterior of fastener 49 to intersect with an interior passage 58 and may not be formed completely through fastener 49. In the figures shown herein passage 58 is drilled into fastener 49 longitudinally, so that passages 58, 54 and 56 all converge at a junction point and are open to one another. As can be seen in FIG. 7, a cylindrical cavity 60 is formed in opening 57 of center section 40 (i.e., between the walls of opening 57 and the outer surface of fastener 49 adjacent thereto). This space permits unrestricted oil flow from passage 53 into bore 58 regardless of the orientation of holes 54 and 56 when fastener 49 is screwed into position. This arrangement permits oil to flow from passage 71B through passage 53 to fastener 49. Bore 58 opens into opening 52, which is connected to fitting 61. Note that the opening into which fitting 61 is inserted may be machined after the unit is completely assembled, such as may be desirable in a field situation. Fitting 61 may then be inserted into that opening and connected to a diagnostic system.

In the embodiment described herein, console 17 is mounted on vehicle 10 and preferably includes an electric warning signal 63 and may include a hydraulic pressure gauge 64. This configuration provides an on-vehicle diagnostic system to provide the user feedback on the operational condition of the unit.

Hydraulic lines 66A and 66B connect fitting 61 to hydraulic gauge 64 through a tee-fitting 62. A pressure transducer 68 is also connected to tee-fitting 62 and is then connected to electric warning signal 63 through electric line 69.

In an alternative embodiment also depicted in FIG. 7, this diagnostic system could also be separate from the vehicle and only attached thereto on an as-needed basis for testing. Here, hydraulic lines 66A and 66B and the elements connected thereto are replaced with a single hydraulic line 66A' connected to a separate diagnostic unit 29 having, for example, a hydraulic gauge 64'. This invention can easily be used with either style of diagnostic system, or with another type of system, and all that is required for such a change is the connection of a different hydraulic connection to fitting 61. It will be understood that the specifics of the diagnostic system, either on-board the vehicle or separate therefrom, are not critical to this invention. The various diagnostics described herein are preferably pressure related and require minimal fluid flow and thus will have minimal effect on the performance of transaxle 20. Further, if diagnostics are no longer required, fitting 61 may be capped or plugged to allow continued operation of the transaxle.

Fastener 49 may optionally include a relief valve 77 in its head portion. While relief valves are generally known, this invention eliminates the need for a separate relief valve and fastener by combining the two features into a single element. Specifically, this design permits the system to bleed off fluid from hydraulic porting 70 to sump 25 if pressure in porting 70 exceeds a desired maximum.

Figure 10:
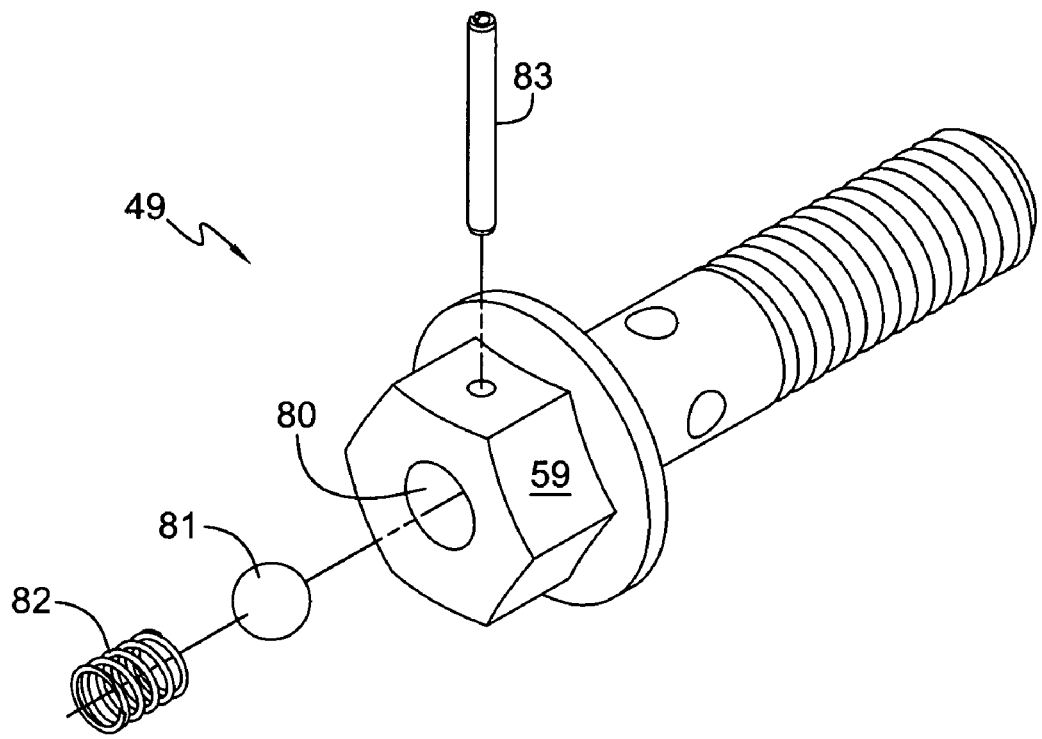
FIG. 10 is an exploded perspective view of the relief valve components of the fastener in FIG. 9.

Relief valve 77 is shown most clearly in FIGS. 7 and 10. Ball 81 is mounted against seat 75 to close bore 58 from opening 80 formed in fastener head 59, and it is biased against seat 75 by spring 82, which is held in place by a pin 83. When pressure in passage 53 and thus bore 58 exceeds a selected level, ball 81 will unseat from seat 75 and permit hydraulic fluid to discharge to sump 25 by way of opening 80. The pressure at which valve 77 will open depends upon application needs and can be changed by selecting spring 82 having the proper spring constant.

Figure 8:
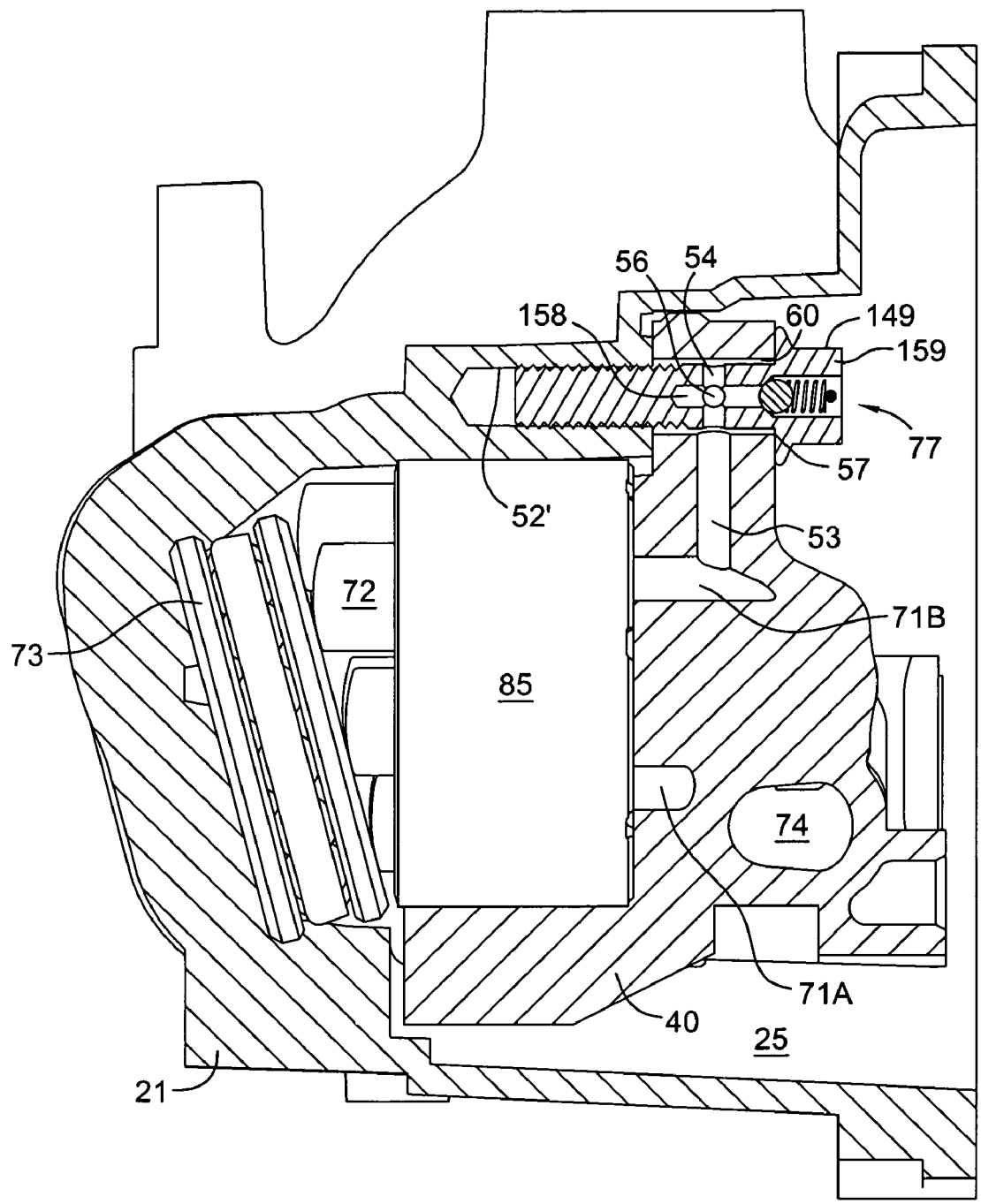
FIG. 8 is another view similar to FIG. 7 and disclosing yet another embodiment of this invention.

FIG. 8 depicts an alternative embodiment of this invention where fastener 149 is not used to connect passage 53 to a diagnostic system, but rather performs the relief valve function only. Passage 158 is bored therein from the hex head 159 to the depth necessary to intersect bores 54 and 56. The relief valve feature of fastener 149 can be otherwise identical to that described above.

Figure 11:
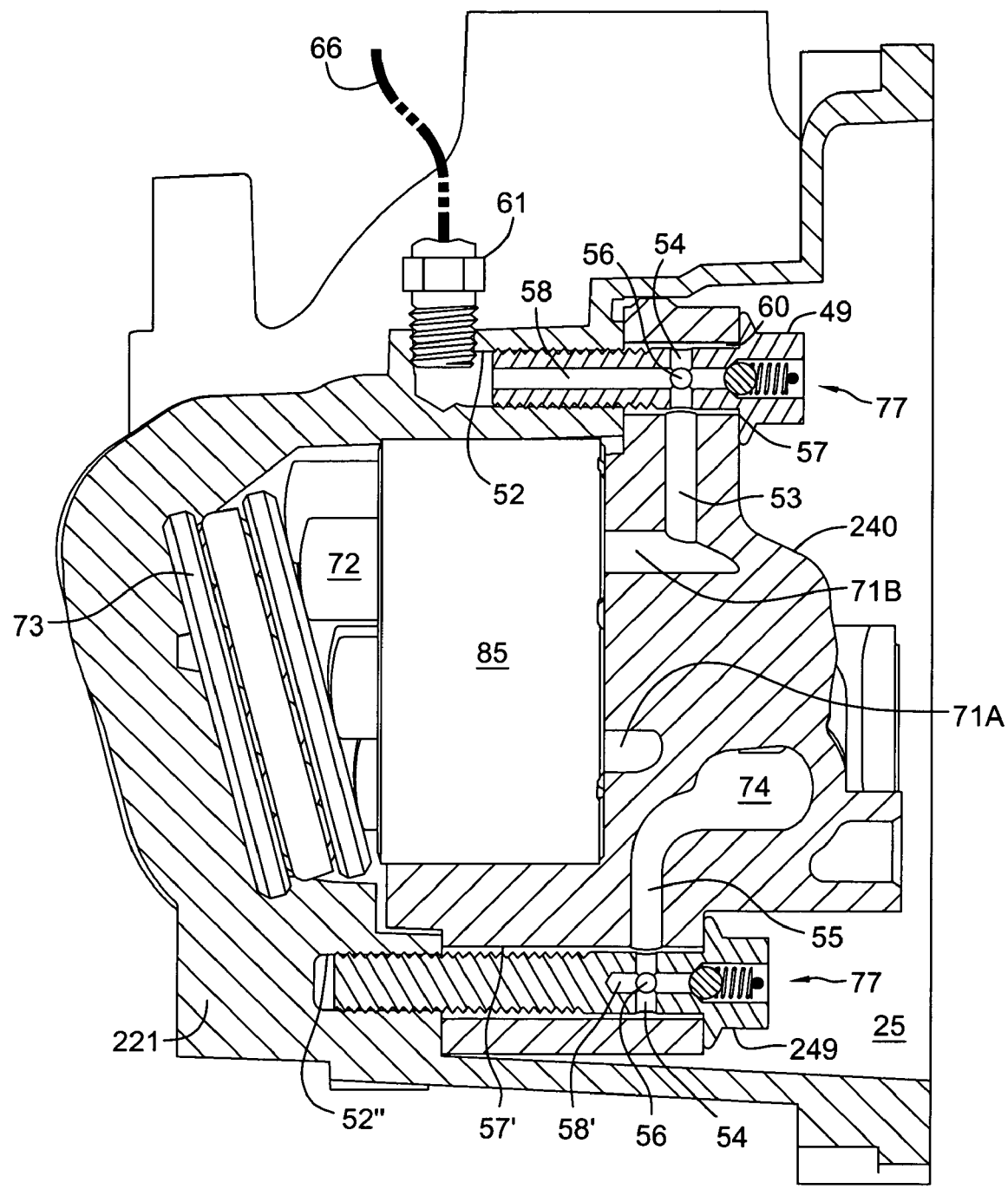
FIG. 11 is a cross-sectional view similar to FIG. 7 of an alternative embodiment of this invention.

Another embodiment is shown in FIG. 11, where two separate fasteners 49 and 249 are depicted. Fastener 49 is depicted as being identical to that described above in FIG. 7. Hydraulic line 66 could be attached from fitting 61 to a diagnostic system of the user's choice as also described above. The second fastener 249 is hydraulically connected through passage 55 to port 74. As described above, port 74 would be connected to motor kidney 88A, while passages 71A and 71B are connected to motor kidney 88B. In this particular embodiment, fastener 249 includes the relief valve features, and does not include the diagnostic features, similar to that described above with respect to FIG. 8.

It will be understood that different combinations are possible within the scope and spirit of this invention. For example, while it is probably not needed for most applications, two fasteners 49 having the diagnostic connection capability could be used, with one connected to each motor kidney. One, both or neither could have the relief valve feature, as needed. Similarly, two fasteners similar to fastener 249 with relief valve capability could be used, with neither one having a diagnostic capability. In essence, this invention provides a wide range of alternatives to the user of the hydraulic system, and it can be easily tailored to meet various needs.

While this invention has been described in connection with bolts, it will be understood that the various passageways could be formed in structure that does not perform the securing function of a bolt or other fastener. If the center section is preferably secured to the housing by another means, then another member could be mounted in a manner similar to fastener 49 to perform the diagnostic functions only.

While specific embodiments of the invention have been described in detail, it will be appreciated by those skilled in the art that various modification and alternatives to those details could be developed in light of the overall teachings of the disclosure. Accordingly, the particular arrangements of the embodiments disclosed are meant to be illustrative only and not limiting as to the scope of the invention which is to be given the full breadth of the appended claims and any equivalents thereof.

The invention claimed is:

1. A hydrostatic apparatus having a housing, comprising:
a hydraulic circuit formed in a structure secured to the housing by means of at least a first fastener having a first fastener port formed therein, wherein the first fastener port is connected to the hydraulic circuit; and
a diagnostic system located external to the housing and connected to the hydraulic circuit at least partially through the first fastener port.

2. A hydrostatic apparatus as set forth in claim 1, wherein the first fastener comprises a threaded bolt.

3. A hydrostatic apparatus as set forth in claim 1, wherein the diagnostic system is located on a vehicle.

4. A hydrostatic apparatus as set forth in claim 1, further comprising a relief valve formed in the first fastener and in fluid communication with the first fastener port to permit hydraulic fluid to be discharged from the hydraulic circuit to a sump.

5. A hydrostatic apparatus as set forth in claim 1, further comprising a fitting mounted to an external surface of the housing and in fluid communication with the first fastener port, and the diagnostic system comprises at least one hydraulic line connected to the fitting.

6. A hydrostatic apparatus as set forth in claim 1, wherein the structure comprises a center section having a pump running surface for mounting a hydraulic pump and a motor running surface for mounting a hydraulic motor.

7. A hydrostatic apparatus as set forth in claim 1, wherein the first fastener comprises a body element having a longitudinal axis and a generally circular cross section and a head secured to a first end of the body element.

8. A hydrostatic apparatus as set forth in claim 7, wherein the first fastener port comprises a first bore formed in a second end of the body element and extending along the longitudinal axis of the body element and a second bore formed in the body element generally perpendicular to the first bore.

9. A hydrostatic apparatus as set forth in claim 8, wherein the first fastener port further comprises a third bore formed in the body element generally perpendicular to the both the first and second bores, whereby the first, second and third bores meet in a single junction point.

10. A hydrostatic apparatus as set forth in claim 9, wherein the second bore extends entirely through the body element.

11. A hydrostatic apparatus as set forth in claim 1, further comprising a second fastener used to secure the structure to the housing and having a second fastener port formed therein, wherein the second fastener port is in communication with the hydraulic circuit and a sump.

12. A hydrostatic apparatus as set forth in claim 11, further comprising a relief valve mounted in the second fastener between the second fastener port and the sump.

13. A hydraulic drive apparatus, comprising:
a housing forming a sump and having at least a first fastener bore formed therein for receiving a first fastener;
a structure mounted to the housing by at least the first fastener and having a hydraulic circuit formed therein; and
a diagnostic system located external to the housing and connected to the hydraulic circuit at least partially through a first fastener port formed in the first fastener.

14. A hydraulic drive apparatus as set forth in claim 13, further comprising a first fitting mounted to an external surface of the housing and in fluid communication with the first fastener bore formed in the housing.

15. A hydraulic drive apparatus as set forth in claim 13, further comprising a second fastener bore formed in the housing for receiving a second fastener used to secure the structure to the housing, the second fastener having a second fastener port in communication with the hydraulic circuit and a relief valve between the hydraulic circuit and the sump.

16. A hydraulic drive apparatus as set forth in claim 15, wherein the first and second fasteners each comprise a body element having a longitudinal axis and a generally circular cross section and a head secured to a first end of the body.

17. A hydraulic drive apparatus as set forth in claim 16, wherein the diagnostic system is located on a vehicle.

18. A hydraulic drive apparatus as set forth in claim 13, further comprising a relief valve formed in the first fastener and in fluid communication between the first fastener port and the sump.

19. A hydraulic drive apparatus as set forth in claim 18, wherein the structure comprises a center section having a pump running surface for mounting a hydraulic pump and a motor running surface for mounting a hydraulic motor.

20. A hydraulic drive apparatus as set forth in claim 13, wherein the first fastener comprises a threaded bolt having a body element with a longitudinal axis and a head portion connected to one end of the body element.

21. A hydraulic drive apparatus as set forth in claim 20, wherein the first fastener port comprises a first bore formed in a second end of the body element and extending along the longitudinal axis thereof and a second bore formed in and extending through the body element generally perpendicular to the first bore.

22. A hydraulic drive apparatus, comprising:
a housing forming a sump and having at least a first opening formed on an internal surface thereof for receiving at least a first fastener;

a structure mounted to the housing by at least the first fastener and having a hydraulic circuit formed therein, wherein the first fastener has a port formed therein to hydraulically connect the first opening to the hydraulic circuit; and a fitting mounted to an external surface of the housing and connected to the first opening, the fitting having a first closed position and a second open position, wherein the hydraulic circuit may be connected to an apparatus located external to the housing when the fitting is in the open position.

23. A hydrostatic drive apparatus for use in a vehicle, comprising:

a housing mounted on the vehicle and forming a sump;

a center section secured to the housing by means of at least a first fastener;

hydraulic porting formed in the center section for connecting a hydraulic pump and a hydraulic motor;

a first fastener port formed in the first fastener and connected to the hydraulic porting;

a second fastener used to secure the center section to the housing and having a second fastener port, and a relief valve mounted in the second fastener between the second fastener port and the sump; and an apparatus located external to the housing and connected to the hydraulic porting through the first fastener port.

24. A hydrostatic drive apparatus as set forth in claim 23, wherein the apparatus comprises a diagnostic system.

25. A hydrostatic drive apparatus as set forth in claim 23, further comprising a relief valve formed in the first fastener and in fluid communication with the first fastener port.

26. A hydrostatic drive apparatus as set forth in claim 23, further comprising a fitting mounted to an external surface of the housing and in fluid communication with the first fastener port, and the external apparatus comprises at least one hydraulic line connected to the fitting.

27. A hydrostatic drive apparatus as set forth in claim 26, wherein the fitting has a first closed position to prevent fluid communication between the external apparatus and the first fastener port and an open position permitting fluid communication between the external apparatus and the first fastener port.

28. A hydrostatic drive apparatus as set forth in claim 23, wherein the hydraulic pump and hydraulic motor are both mounted on the center section.

29. A hydrostatic drive apparatus as set forth in claim 23, further comprising at least one axle mounted in the housing and drivingly engaged to the hydraulic motor.

30. A hydrostatic drive apparatus as set forth in claim 29, further comprising a gear train mounted in the housing between the at least one axle and the hydraulic motor.

* * * * *